(12) United States Patent
Häfele et al.

(10) Patent No.: US 11,819,370 B2
(45) Date of Patent: Nov. 21, 2023

(54) DENTAL PROSTHESIS, ASSOCIATED SEMI-FINISHED PRODUCT AND KIT

(71) Applicant: Ivoclar Vivadent AG, Schaan (LI)

(72) Inventors: Clemens Andreas Häfele, Weiler (AT); Robert Wolfgang Krybus, Oberschan (CH); Konrad Hagenbuch, Haag (CH)

(73) Assignee: Ivoclar Vivadent AG, Schaan (LI)

( * ) Notice: Subject to any disclaimer, the term of this patent is extended or adjusted under 35 U.S.C. 154(b) by 741 days.

(21) Appl. No.: 16/418,329

(22) Filed: May 21, 2019

(65) Prior Publication Data

US 2019/0358004 A1  Nov. 28, 2019

(30) Foreign Application Priority Data

May 24, 2018  (EP) .................................. 18174001

(51) Int. Cl.
*A61C 13/16* (2006.01)
*A61C 13/01* (2006.01)
*A61C 13/10* (2006.01)

(52) U.S. Cl.
CPC .............. *A61C 13/16* (2013.01); *A61C 13/04* (2013.01); *A61C 13/10* (2013.01)

(58) Field of Classification Search
CPC ......... A61C 13/16; A61C 13/04; A61C 13/10; A61C 13/1003; A61C 13/1006
See application file for complete search history.

(56) References Cited

U.S. PATENT DOCUMENTS

| | | | |
|---|---|---|---|
| 4,595,364 A * | 6/1986 | Kusano | A61C 13/04 433/185 |
| 7,040,895 B2 * | 5/2006 | Davis | A61C 13/24 433/185 |
| 7,578,667 B2 | 8/2009 | Wachter et al. | |
| 2013/0171588 A1 * | 7/2013 | Shima | A61C 13/01 433/192 |

\* cited by examiner

*Primary Examiner* — Cris L. Rodriguez
*Assistant Examiner* — Drew S Folgmann
(74) *Attorney, Agent, or Firm* — Ann M. Knab; Thad McMurray

(57) ABSTRACT

A dental prosthesis having a prosthesis base and a set of teeth, namely a full set of teeth or a partial set of teeth, is provided, wherein the prosthesis base comprises at least one dental recess for receiving the set of teeth, and wherein the set of teeth is glued into the at least one dental recess by an adhesive. In the dental recess and/or in or at the set of teeth an adhesive channel is configured which extends along the at least one dental recess or the dental arch in its main direction of extension. It starts at an adhesive filling opening whose configuration is adapted to a filling element.

16 Claims, 4 Drawing Sheets

DENTAL PROSTHESIS, ASSOCIATED SEMI-FINISHED PRODUCT AND KIT

CROSS-REFERENCE TO RELATED APPLICATIONS

This application claims priority to European patent application No. 18174001.0 filed on May 24, 2018, all the disclosures of which are incorporated herein by reference in their entirety.

TECHNICAL FIELD

The invention relates to a dental prosthesis as well as a semi-finished product and a kit.

BACKGROUND

It has been known for a long time to glue prostheses, which also include partial prostheses, to the associated teeth which form a set of teeth, that is to say either a full set of teeth or a partial set of teeth.

Typically, for this purpose, adhesive is inserted into the groove-shaped dental recess, and the set of teeth is pressed into the dental recess. In this connection, part of the adhesive oozes out at the gingival margin.

This part of the adhesive needs to be removed in a further process step, for instance by grinding off or milling.

It has also been suggested to work with less adhesive such that no bead of adhesive is formed if possible. With this solution, there is the danger, however, that the adhesive gap is not filled completely. Inner corners remain, which form a bacteria trap, in particular intraorally, and thus need to be avoided urgently.

In order to improve adhesion it has also become known to additionally or exclusively apply the adhesive to the gingival side of the set of teeth. However, in case of this solution, too, the quality of the gluing, and in particular the uniform thickness along the extension of the dental arch, depends on the skill of the dental technician.

In addition, auxiliary means have been suggested to improve the alignment of the set of teeth in the prosthesis base. In this respect, so-called transfer templates have proven to be successful which enable clear assignment of the respective teeth with their tooth recesses and in particular fine adjustment of the position. Reference is hereby made to commonly owned, copending U.S. application Ser. No. 15/029,041 filed Apr. 13, 2016 and U.S. application Ser. No. 14/890,987 filed Nov. 13, 2015, both directed to transfer templates, both applications hereby incorporated by reference in their entirety.

These solutions definitely have advantages but do not ensure a uniform adhesive gap along the extension of the dental arch.

In particular, if the application of the adhesive is too small at a position or a region along the extension of the dental arch, the dental technician tends to press the set of teeth thereat into the dental recesses by means of pressure between the thumb and the index finger.

However, this leads to displacement of the adhesive located thereat such that, contrary to the intention of the dental technician, no adhesive is present anymore at the respective position which would come into consideration for the adherence, or too little adhesive is present for the adhesion as the elements spring back from one another as the adhesive is displaced by the spring force at this position.

In addition, it has been known to inject materials used for the modeling.

However, these known measures may not solve the above-mentioned problem.

SUMMARY OF THE INVENTION

Thus, the invention is based on the task of providing a dental prosthesis in accordance with the claims, a semi-finished product in accordance with the claims as well as a kit in accordance with the claims, which allow for improved provision of a dental prosthesis or rather of the associated semi-finished product undisturbed by handling errors.

This task is inventively solved by the independent claims. Advantageous developments may be taken from the sub-claims.

According to the invention, it is particularly favorable that an adhesive channel, which is shaped purposefully and in a controlled manner, may ensure a defined thickness of the layer of adhesive along the entire adhesive area of the prosthesis. The thickness of the layer of adhesive may be controlled by designing the surfaces, which face one another but also by means of fluidic measures and is configured to not fall below a minimum layer thickness nowhere. This minimum dimension may be determined in turn to be for instance 0.06 mm, for instance depending on the used adhesive.

According to the invention, it is particularly favorable that the adhesive channel extends in the main direction of extension of the dental arch, namely in the transition area between the dental arch and the prosthesis base. In this way, the adhesive channel may reliably spread the adhesive over a long distance and extensively in accordance with the invention, for instance starting from the distal side of a dental arch.

For this purpose, the adhesive channel is calculated rheologically depending on the flow properties of the adhesive and the flow resistance is particularly taken into account at every position.

The aim of this calculation is to uniformly and completely fill all parts of the adhesive channel and of the adhesive surfaces, that is to say those surfaces on which the layer of adhesive extends.

Preferably, the adhesive channel is configured in the manner of a tree structure starting from an adhesive filling opening, that is to say with a main channel from which side channels extend away to the sides, that is to say to the gingival margin.

According to the invention, it is particularly favorable if not only the adhesive channel but also the adhesive surfaces, which extend laterally next to the adhesive channel and between the side branches of the channel, are configured with a predetermined dimensioning.

For instance, on the adhesive surface for the layer of adhesive a gap may be configured such that tapering occurs towards the edge, that is to say, towards the gingival margin. This leads to a flow resistance, which serves to provide uniform filling with adhesive.

In addition, at the position of the taper the flow rate of the adhesive increases such that the danger of an adhesive gap is minimized.

Preferably, it is provided that the adhesive channel comprises a channel axis, which lies in the extension of an adhesive surface in its height position, said surface extending to the side of the adhesive channel. This solution offers the smallest flow resistance.

The adhesive channel may be filled securely and with controlled pressure by means of a pressure-tight connection with a filling element. An example of this is a Luer Lock connection between a syringe and a matching syringe adapter, which is inserted into the prosthesis base and/or the set of teeth.

Then, it is preferred that the syringe adapter merges into the adhesive channel on the inside in a substantially flush manner and comprises a conic inner shape, which is adapted to a commercially available syringe nozzle, the syringe cone.

The syringe adapter may also be formed by two half shells which comprise a horizontal parting plane. This may be favorable for the attachment at the transition between set of teeth and base.

Alternatively, instead of the syringe an adhesive pump may also be used which inserts the adhesive into the adhesive channel in accordance with a predefined pressure profile.

Typically, the set of teeth is configured to be shaped like an arch and forms a dental arch in this respect.

The invention is not limited to a full prosthesis with a full set of teeth. Rather, it may also be used in case of a partial prosthesis with a partial set of teeth.

According to the invention, it is preferred if the set of teeth is held in position in the dental recess of the prosthesis base for instance by means of a clamp holder. This may be realized for instance by a clamp holder in accordance with EU DM/089 612. It has become known as a poly-fixator. With this solution, prosthesis and set of teeth are pressed onto one another, namely using a defined clamping force.

Further, an injection system is known from EP 1 897 513 B1 in which the included ventilation channel ends at a filter element. It is shut off by injection material as soon as the ventilation channel is filled completely. A solution of this type may also be applied analogously according to the invention in an advantageous development.

Preferably, at least the inventive prosthesis base is produced with the help of a computer, that is to say for instance by CAD/CAM. In case of a solution of this type, it is possible, without performing an additional process step, to also realize the adhesive channel in an optimized shape, for instance by milling.

In an advantageous configuration, it is provided that the adhesive channel has a height of between 0.3 mm and 5 mm, in particular between 0.5 mm and 1.5 mm in the gingival/occlusal direction and/or that the flow area of the adhesive channel at least partially decreases starting from the filling opening.

It is advantageous that the adhesive channel (14) comprises a height H of between 0.3 mm and 5 mm, in particular of between 0.5 mm and 1.5 mm, in the gingival/occlusal direction, and/or that the flow area of the adhesive channel (14) at least partially decreases starting from the filling opening (19).

In a further advantageous configuration it is provided that an adhesive surface extending to the sides of the adhesive channel comprises a thickness of between 50 and 1000 μm and in particular of between 150 and 350 μm.

In yet another advantage, the adhesive channel merges into the adhesive surface with a transition, which is shaped favorably in terms of flow, in particular with curved or rounded geometry.

Due to the exactly calculated dimensioning of the adhesive channel and thus of the adhesive surface in its three-dimensional design the bead of adhesive may be reduced significantly without risking the danger of the occurrence of an adhesive gap.

It is preferred that the dental arch is produced from a one-piece tooth-colored blank or semi-finished product, in particular subtractively or additively, and that the receiving portion of the dental arch extending into the at least one dental recess of the prosthesis base comprises a cross section having these diverging side flanks.

In a particular embodiment, the dental arch comprises a substantially uniform cross section of the receiving portion for the reception in the dental recess along its extension, which may possibly taper slightly towards the incisor region. The adhesive channel is configured at least partially in the basal surface of the receiving portion of the dental arch in the dental recess.

The dental arch may include individual teeth, which are each glued into the dental recess or into the dental recesses, wherein the adhesive channel is provided centrally at the basal surface of the individual teeth.

The adhesive channel includes side branches open to the sides, in the mesial/distal direction, which merge into the adhesive surface thereat. The adhesive channel side branches extend in the vestibular and/or oral direction starting from the adhesive channel and end before the gingival margin.

At the end of the adhesive channel, opposite the adapter, a ventilation opening is configured which is in particular closed by a filter element.

The invention also relates to a semi-finished product as a pre-product for the production of an inventive dental prosthesis. It may be produced cost-effectively and standardly and then be adapted to the requirements in a final step.

The semi-finished product as a pre-product for a dental prosthesis has a prosthesis base, which is produced from a base blank, in particular by milling, wherein the prosthesis base includes at least one dental recess for receiving a dental arch. The prosthesis base is produced to have an excess at positions outside of the dental recess, wherein an adhesive channel is configured at least partially in the dental recess, the adhesive channel extending along the dental recess in its main direction of extension.

Another embodiment is directed to a kit for producing a dental prosthesis, having a tooth-colored blank for a set of teeth and a gum-colored base blank. At a position at which the blank for a set of teeth and the base blank face one another and are intended to be glued to one another a prosthesis channel is configured in the blank for a set of teeth and/or the base blank.

The kit further includes a filling element or device such as a syringe adapter and adhesive, and possibly a filter element, which is intended to be attached to the end of the prosthesis channel provided opposite the filling element.

BRIEF DESCRIPTION OF THE DRAWINGS

Further advantages, details and features may be taken from the following description of an exemplary embodiment of the invention in conjunction with the drawings.

DETAILED DESCRIPTION

Figure 1:
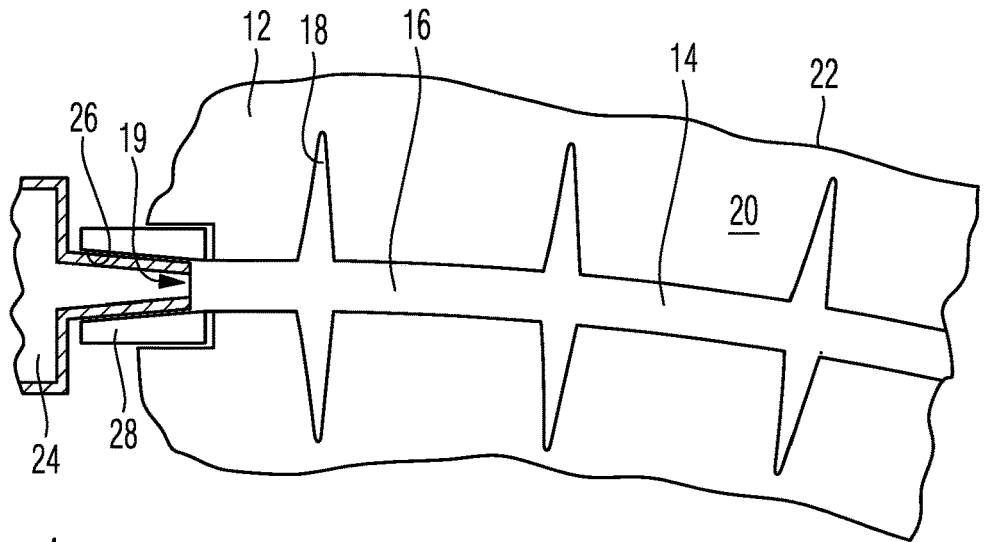
FIG. 1 shows a schematic top view of a part of an inventive dental prosthesis illustrating the adhesive channel in an inventive embodiment.

In FIG. 1, an inventive dental prosthesis 10 is illustrated schematically. The illustration refers to the contact surface between the prosthesis base and the dental arch. The dental arch ends at the proximal end 12 and is only illustrated in a partial area; in fact, it extends in a bent fashion as a partial dental arch and substantially shaped in the manner of a U as a full dental arch.

Figure 2:
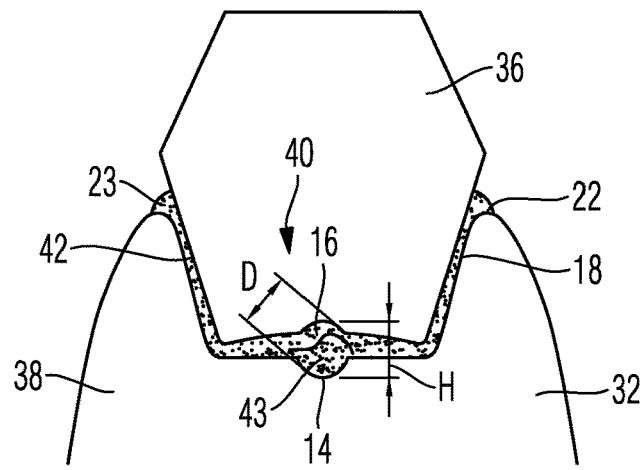
FIG. 2 shows a cross section through a schematically illustrated inventive dental prosthesis in the embodiment in accordance with FIG. 1.

Even if the illustration according to FIG. 1 is realized extensively, it is to be understood that an unrolled view is illustrated in itself having a substantially U-shaped extension, as is also apparent from FIG. 2.

According to the invention, an adhesive channel 14 is configured in the transition area between the set of teeth and the base. The adhesive channel comprises a main channel 16 from which side channels 18 branch off.

The adhesive channel 14 starts at an adhesive filling opening 19 via which adhesive may be supplied under pressure. In the exemplary case, it is provided at the distal end 12. It is possible to shift the arrangement from this position to any desired other position.

An adhesive surface 20 extends laterally next to the main channel 16 and between the side channels 18 which is configured as a gap for adhesive and which is filled with adhesive by the main channel 16 and the side channels 18.

Filling takes place up to a gingival margin 22 in such a manner that the adhesive gap in accordance with the adhesive surface 20 is wetted completely with adhesive. Then, typically, some adhesive leaks from the gingival margin 22.

The adhesive is inserted into the adhesive channel 14 via a filling element 24. The filling opening 19 is adapted to the shape of the filling element 24 such that a pressure-tight connection is realized thereat.

In the exemplary embodiment illustrated, the filling element 24 is configured as a syringe. The syringe comprises a syringe cone 26, which protrudes into a syringe adapter 28 and is sealed thereat.

In the exemplary embodiment illustrated, the syringe adapter 28 is molded in the prosthesis base material 32.

Now, filling of the adhesive channel is carried out such that initially the filling element 24 is inserted into the syringe adapter 28. By actuation of the syringe, the adhesive located therein is squeezed out and enters the adhesive channel 14 via the filling opening 19 in the region of the end 12. From there, the adhesive continues to flow—in the illustration according to FIG. 1 to the right—and spreads into the side channels 18 of the main channel 16 step by step.

After the channels are filled, at least to a large extent the adhesive flows into the gap, which is formed by the adhesive surfaces 20. There, the flow resistance is larger than in the adhesive channel 14.

The filling of the dental prosthesis with adhesive is continued until adhesive is squeezed out from all around the gingival margin 12. This is a good possibility to ensure by means of a visual inspection that no adhesive gap remains.

For hardening of the adhesive, the dental prosthesis, which is otherwise, finished remains in the clamping fixture for several minutes, for instance 1:30 minutes to 4 minutes, and may then be removed ready for use.

In the embodiment illustrated according to FIG. 2 the adhesive channel 14 extends both on the basal and on the gingival side of the dental arch 36. The side channels 18 extend up to the gingival margin 22 and thus on the gingival side, too.

At least with regard to the main channel 16, the adhesive channel 14 is configured both on the side of the prosthesis base 38 and on the side of the dental arch 36. In the exemplary embodiment illustrated the main channel 14 comprises a round cross section with a diameter D wherein any desired other cross section is also possible, including but not limited to an elliptical, circular, square, rectangular, polygonal and oval cross sections.

The adhesive main channel 14 and the side channels 18 are preferably configured to converge, that is to say decrease in diameter, towards their ends. For instance, the adhesive channel 14 may decrease in diameter D from 1.5 mm to 0.8 mm along the extension of the dental arch. The adhesive main channel 14 has a height H in the vertical direction, as is apparent from FIG. 2.

Analogously, the reduction also holds true for the adhesive surface 20 whose gap decreases towards the gingival margin 22. Excess adhesive 23 is illustrated schematically at the gingival margin.

The adhesive channel may comprise a channel axis 43, which is intersected in its height by the extension of the adhesive surface 20. However, displacement in the occlusal or gingival direction is also possible.

The invention is not limited to the realization of the dental arch 36 in one piece. Rather, the dental arch 36 may also consist of individual teeth as is apparent from FIG. 4 with the teeth 37a and 37b, which are each glued into the dental recess 40 or the dental recesses. Then, the adhesive channel 14 may extend along the basal surface of the individual teeth.

The shape of the dental recesses 40 and accordingly of the gingival area of the dental arch 36 may be adapted to the requirements to a large extent. Here, aesthetic considerations play a role.

In contrast, it is possible according to the invention to slightly overshadow mechanical aspects, as adhesive reliability and adhesiveness are improved inventively.

Figure 3:
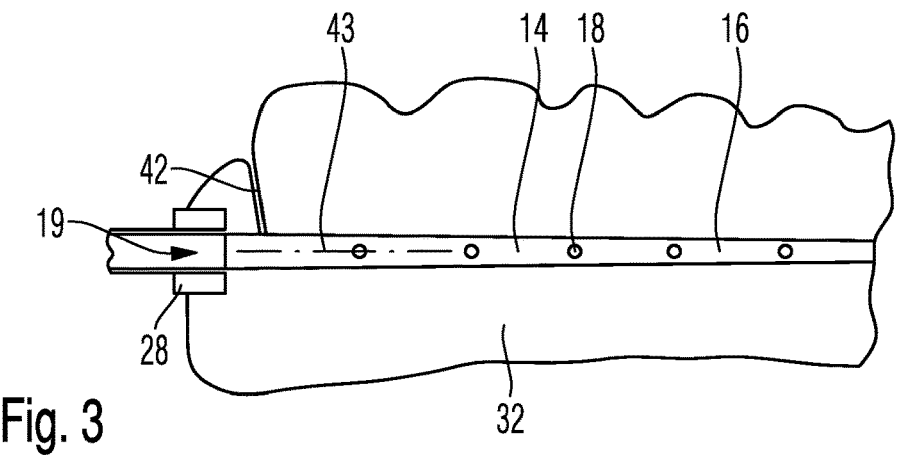
FIG. 3 shows a schematic longitudinal section of the embodiment in accordance with FIGS. 1 and 2.

It is apparent from FIG. 3 how the adhesive channel 14 extends between the dental arch 36 and the prosthesis base material 32. As is apparent, the syringe adapter 28 is received in the prosthesis base material 32. Numerous subchannels 18 extend laterally away from the main channel 16 and the adhesive gap 42 is reliably filled with adhesive completely, that is to say up to the gingival margin 22 or beyond.

Figure 4:
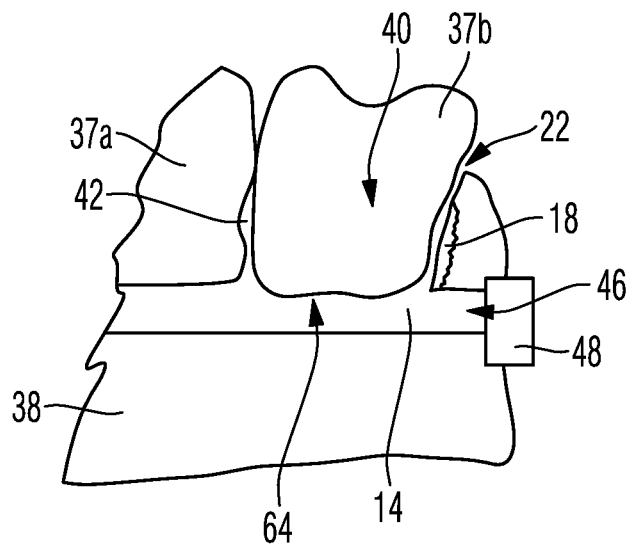
FIG. 4 shows a schematic longitudinal section of a further embodiment of the invention.

In a further embodiment according to FIG. 4, it is apparent that a ventilation opening 46 is configured at the end of the adhesive channel 14 opposite the filling opening. It is closed by a filter element 48 wherein it is referred fully to EP 1 897 513 B1. The filter element 48 allows for ventilation of the adhesive channel 14, but closes off as soon as it is reached by adhesive.

In this way, sufficient pressure may be built in the flow of adhesive in order to provide even adhesive surfaces with a small adhesive gap 42 with adhesive.

Here, the set of teeth is made up of individual teeth of which the individual teeth 37a and 37b are apparent. The adhesive surface with the adhesive gap 42 extends around the individual tooth in a three-dimensional way known per se, wherein preferably also side channels 18, as described above, serve to improve the supply of the adhesive gap 42 up to the gingival margin 22.

Figure 5:
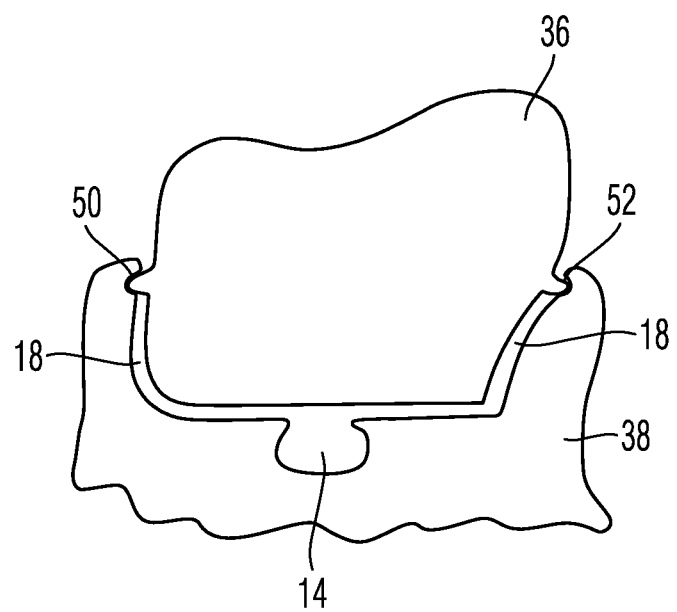
FIG. 5 shows a cross section through a schematically illustrated further inventive embodiment.

In a further embodiment according to FIG. 5 fastening elements 50 and 52 are provided which fasten the set of teeth and the base 38 relative to one another at a fixed position. They may snap into place and may be provided, for instance, as click elements or snap locks at the dental arch 36 and/or the prosthesis base 38 in order to position these two elements against each other. The fastening elements 50 and 52 each allow for a positive connection between the dental arch 36 and the base 38 and snap into place. In this respect, the dental arch 36 may simulate a transfer template at which the prosthesis base 38 is snapped into place.

As is apparent, the adhesive channel 14 extends in the base 38 in this embodiment and comprises an oval cross section and a rounding 44 to improve influx into the side channels 18.

Figure 6:
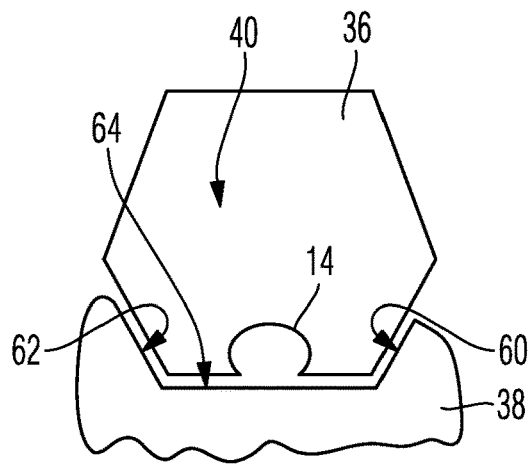
FIG. 6 shows a cross section through a schematically illustrated further inventive embodiment.
Figure 7:
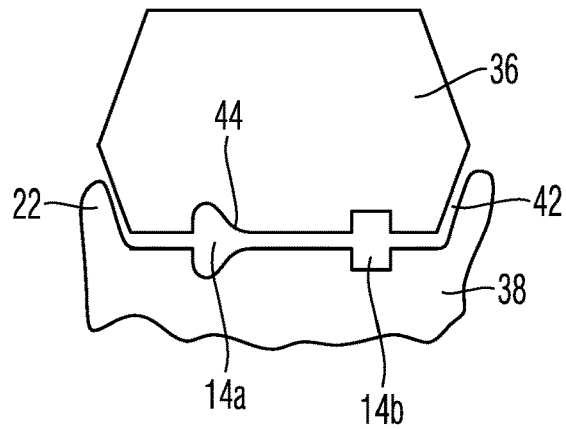
FIG. 7 shows a cross section through a schematically illustrated further inventive embodiment.

FIG. 6 and FIG. 7 show different other embodiments of the adhesive channel 14. According to FIG. 6, it is configured completely in the dental arch 36 and comprises an oval cross section. The dental recess 40 comprises diverging side flanks 60, 62, starting from a basal surface 64.

According to FIG. 7, two adhesive channels 14a and 14b are configured next to one another. Channel 14a has an asymmetric, substantially triangular cross section with a focus of flow towards the adjoining gingival margin 22, while channel 14b has a rectangular cross section.

Between the channels 14a and 14b, the adhesive gap 42 is thinner as it is subjected with adhesive from both sides.

While here, as above, the adhesive channel 14 is illustrated with regard to the premolar and molar region, it is to be understood that a respective adhesive channel 14 may also be configured in the incisor region 50.

Figure 8:
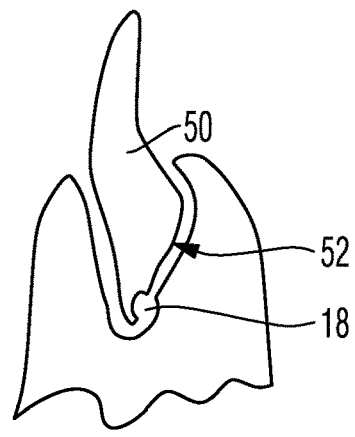
FIG. 8 shows a cross section through a schematically illustrated further inventive embodiment.

This is illustrated in FIG. 8. There, in the absence of a basal surface, it may extend at the oral or labial gingival surface 52 of the incisor 50 relatively far to the gingival end of the incisor along the incisor in a displaced way.

Figure 9:
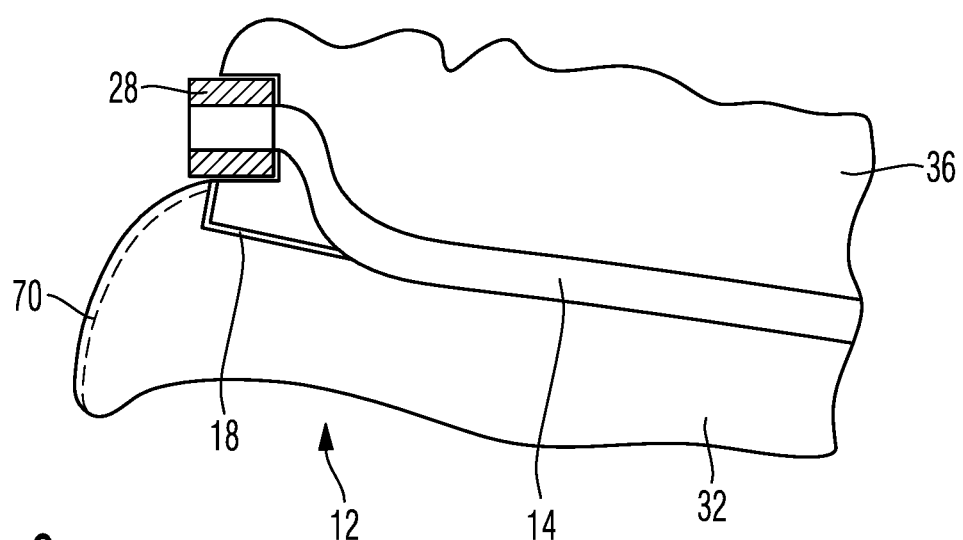
FIG. 9 shows a cross section through a schematically illustrated further inventive embodiment.

In the embodiment in accordance with FIG. 9, the filling element 28 is disposed at the dental arch 36. The adhesive channel 14 extends therefrom initially in the direction of the transition between the dental arch 36 and the base 32 and then at the level of the transition.

In this embodiment, the prosthesis base 32 is produced to have an excess 70 such that it is possible in a last milling step with an already glued in dental arch to reduce the prosthesis base 32 exactly to the desired dimensions, and to remove any possible excess adhesive at the same time.

A subchannel 18 runs back to the proximal end 12 in this embodiment in order to provide these areas with adhesive, too.

Figure 10:
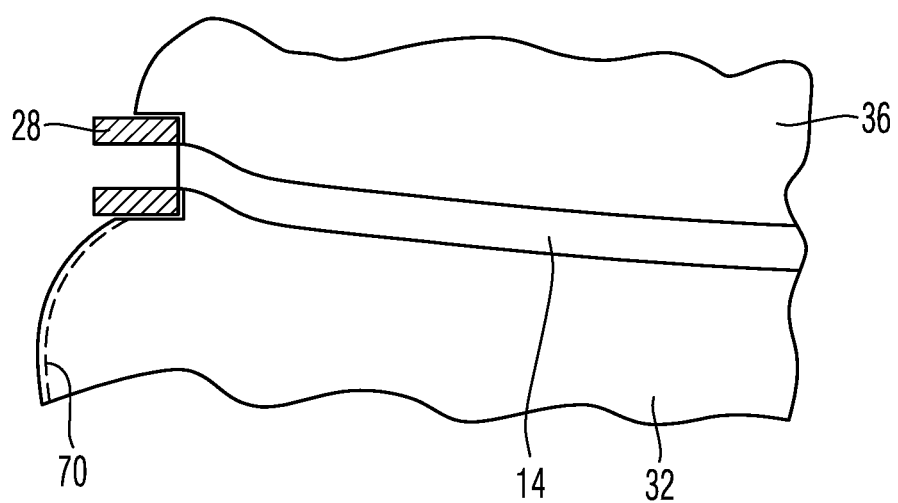
FIG. 10 shows a cross section through a schematically illustrated further inventive embodiment.

In the embodiment according to FIG. 10, the filling element 28 is disposed at the transition between the dental arch 36 and the base 32. Then, it is at the same level as the transition between the dental arch 36 and the base 32.

Here, too, the excess 70 is indicated.

The invention claimed is:

1. A dental prosthesis comprising
a prosthesis base (38),
a dental arch (36), and
an adhesive for adhering the prosthesis base and dental arch together,
wherein the prosthesis base (38) comprises at least one dental recess (40) for receiving the dental arch (36), and
wherein the dental arch (36) is glued into the at least one dental recess (40) by the adhesive,
wherein the dental recess (40) and/or at the dental arch (36) comprise an adhesive channel (14) configured to extend along the at least one dental recess (40) or the dental arch (36) in a main direction of the dental arch,
wherein starting from the adhesive channel (14) which is configured as a tree-structure comprising a main channel (16) from which side branches extend away from the main channel (16), the main channel (16) extends centrally at a basal side of the dental arch and extends from a palatal/lingual direction to a vestibular direction, a three-dimensionally shaped adhesive surface (20) extends between the dental arch (36) and the prosthesis base (38) and reaches gingival margin (22),
wherein the side branches (18) extend in the vestibular and/or palatal/lingual direction starting from the main channel (16) and terminate before the gingival margin (22).

2. The dental prosthesis as claimed in claim 1,
wherein the dental arch (36) comprises a full set of teeth or a partial set of teeth.

3. The dental prosthesis as claimed in claim 1,
wherein the adhesive channel (36) starts at an adhesive filling opening (19) having a configuration adapted to a filling carrier (24).

4. The dental prosthesis as claimed in claim 3,
wherein at the filling opening (19) of the adhesive channel (14) a syringe adapter (28) is attached either as a separate element or molded in the prosthesis base material (32) and/or the dental arch material, by which adapter (28) the adhesive may be inserted into the adhesive channel (14).

5. The dental prosthesis as claimed in claim 4,
wherein the syringe adapter (28) is attached either as a separate element or molded in the dental arch material, by which adapter (28) the adhesive may be inserted into the adhesive channel (14), wherein at an end of the adhesive channel, opposite the adapter (28), a ventilation opening (46) is configured which is closed by a filter element (48).

6. The dental prosthesis as claimed in claim 1,
wherein the adhesive channel (14) extends centrally at the basal and/or gingival side of the dental arch (36) and/or prosthesis base (38) and/or that the adhesive channel (14) comprises a round cross section.

7. The dental prosthesis as claimed in claim 6,
wherein the adhesive channel (14) comprises a round cross section which is an elliptical or circular cross section.

8. The dental prosthesis as claimed in claim 1,
wherein the adhesive channel (14) has a smaller extension in the occlusal/gingival direction than in the palatal/vestibular direction.

9. The dental prosthesis as claimed in claim 8,
wherein a height/width ratio of the channel in the occlusal/gingival direction is at a height/width ratio of 1:1.1 or 1:1.5, and in the palatal/vestibular direction is at a height/width ratio of 1:5 or 1:1.5.

10. The dental prosthesis as claimed in claim 1,
wherein the adhesive channel (14) comprises a height H of between 0.3 mm and 5 mm or between 0.5 mm and 1.5 mm in the gingival/occlusal direction, and/or
wherein the flow area of the adhesive channel (14) at least partially decreases starting from the filling opening (19).

11. The dental prosthesis as claimed in claim 1,
wherein the adhesive surface (20) extending to the sides of the adhesive channel (14) comprises a thickness of between 50 and 1000 μm or between 150 and 350 μm.

12. The dental prosthesis as claimed in claim 1,
wherein the dental arch (36) is produced from a one-piece tooth- or semi-finished product by a subtractive or additive process, and
wherein the receiving portion of the dental arch (36) extending into the at least one dental recess (40) of the prosthesis base (38) comprises a cross section having diverging side flanks (60, 62).

13. The dental prosthesis as claimed claim 12,
wherein the dental arch comprises a substantially uniform cross section of the receiving portion for the reception in the dental recess (40) along its extension, which taper slightly towards the incisor region (50), and
wherein the adhesive channel (14) is configured at least partially in the basal surface (64) of the receiving portion of the dental arch (36) in the dental recess (40).

14. The dental prosthesis as claimed in claim 1,
wherein the dental arch (36) comprises individual teeth (37a, 37b) which are each glued into the dental recess (40) or into the dental recesses,
wherein the adhesive channel (14) is provided centrally at the basal surface (64) of the individual teeth.

15. The dental prosthesis as claimed in claim 1,
wherein the adhesive channel side branches (18) are each open to the sides in the mesial/distal direction, and
wherein the adhesive channel side branches merge into the adhesive surface (20) thereat.

16. A dental prosthesis comprising
a prosthesis base (38),
a dental arch (36), and
an adhesive for adhering the prosthesis base and dental arch together,
wherein the prosthesis base (38) comprises at least one dental recess (40) for receiving the dental arch (36), and
wherein the dental arch (36) is glued into the at least one dental recess (40) by the adhesive,
wherein the dental recess (40) and/or at the dental arch (36) comprise an adhesive channel (14) configured to extend along the at least one dental recess (40) or the dental arch (36) in a main direction of the dental arch,
wherein starting from the adhesive channel (14) which is configured as a tree-structure comprising a main channel (16) from which side branches extend away from the main channel (16), the main channel (16) extends from and covers an area from a palatal/lingual direction to a vestibular direction, a three-dimensionally shaped adhesive surface (20) extends between the dental arch (36) and the prosthesis base (38) and reaches a gingival margin (22),
wherein the side branches (18) extend in the vestibular and palatal/lingual direction starting from the main channel (16) of the adhesive channel (14) and terminating before the gingival margin (22).

* * * * *